US012125386B2

(12) United States Patent
Oikawa et al.

(10) Patent No.: US 12,125,386 B2
(45) Date of Patent: Oct. 22, 2024

(54) ROAD STUD, ROAD STUD SYSTEM, METHOD FOR CONTROLLING ROAD STUD, AND CONTROL PROGRAM PRELIMINARY CLASS

(71) Applicant: TOYOTA JIDOSHA KABUSHIKI KAISHA, Toyota (JP)

(72) Inventors: Susumu Oikawa, Yokohama (JP); Hiroyuki Nakatani, Gotenba (JP); Kenichi Kitahama, Toyota (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 71 days.

(21) Appl. No.: 17/988,852

(22) Filed: Nov. 17, 2022

(65) Prior Publication Data

US 2023/0169866 A1 Jun. 1, 2023

(30) Foreign Application Priority Data

Nov. 26, 2021 (JP) ................................ 2021-191683

(51) Int. Cl.
*G08G 1/16* (2006.01)

(52) U.S. Cl.
CPC ............. *G08G 1/166* (2013.01); *G08G 1/164* (2013.01)

(58) Field of Classification Search
None
See application file for complete search history.

(56) References Cited

U.S. PATENT DOCUMENTS

| | | | | |
|---|---|---|---|---|
| 10,173,685 B2 * | 1/2019 | Schaper | G06V 20/588 |
| 11,405,467 B2 * | 8/2022 | Abou-Rizk | H04L 41/0806 |
| 2007/0280781 A1 * | 12/2007 | Jeong | E01F 9/559 404/16 |
| 2011/0187321 A1 | 8/2011 | Hirayama | |
| 2016/0154099 A1 * | 6/2016 | Saito | G01S 7/412 342/28 |
| 2017/0140648 A1 * | 5/2017 | Sogabe | G08G 1/096716 |
| 2017/0221366 A1 * | 8/2017 | An | G08G 1/09623 |
| 2017/0270785 A1 * | 9/2017 | Umehara | G08G 1/08 |
| 2017/0289821 A1 * | 10/2017 | Berry | G01S 1/68 |
| 2018/0305876 A1 * | 10/2018 | Langford | G01W 1/02 |
| 2020/0363043 A1 * | 11/2020 | Stegeman | F21V 21/116 |

(Continued)

FOREIGN PATENT DOCUMENTS

| | | |
|---|---|---|
| JP | H06-245326 A | 9/1994 |
| JP | 11191197 A * | 7/1999 |

(Continued)

*Primary Examiner* — Muhammad Adnan
(74) *Attorney, Agent, or Firm* — Dinsmore & Shohl LLP

(57) ABSTRACT

A road stud includes a terminal storage unit, a light emission unit, a moving body detection unit, a radio communication unit, and a terminal control unit. The terminal storage unit stores preset unique fixed position information. The light emission unit emits a preset light to the surroundings. The moving body detection unit generates a detection signal indicating that a nearby moving body has been detected. The radio communication unit receives, based on fixed position information, an instruction signal for an operation of the light emission unit from a predetermined control system and transmits a detection signal to the control system. The terminal control unit controls a light emission unit based on the instruction signal.

9 Claims, 10 Drawing Sheets

(56) References Cited

U.S. PATENT DOCUMENTS

| | | | | |
|---|---|---|---|---|
| 2022/0119009 | A1* | 4/2022 | Lee | B60W 40/10 |
| 2022/0319315 | A1* | 10/2022 | Kai | G08G 1/081 |
| 2023/0167615 | A1* | 6/2023 | Oikawa | E01F 9/30<br>340/907 |
| 2024/0029567 | A1* | 1/2024 | Han | G08G 1/0116 |

FOREIGN PATENT DOCUMENTS

| | | | | |
|---|---|---|---|---|
| JP | H11-191197 | A | | 7/1999 |
| JP | 2000-345522 | A | | 12/2000 |
| JP | 2008-215991 | A | | 9/2008 |
| JP | 2010-068632 | A | | 3/2010 |
| JP | 2018-132833 | A | | 8/2018 |
| JP | 2020-144576 | A | | 9/2020 |
| JP | 2021-090342 | A | | 6/2021 |
| KR | 100345372 | B1 | * | 11/2002 |
| WO | 2013/080860 | A1 | | 6/2013 |

* cited by examiner 230 150 330

| FIXED POSITION INFORMATION | STATE OF LIGHT EMISSION UNIT A | STATE OF LIGHT EMISSION UNIT B | STATE OF DETECTION SIGNAL | GROUP ATTRIBUTE INFORMATION |
|---|---|---|---|---|
| E137.16021,N35.05075 | 0:1:0 | 1:0:0 | LO | 20A |
| E137.16022,N35.05074 | 0:1:0 | 1:0:0 | HI | 20A |
| E137.16023,N35.05073 | 0:0:0 | 0:0:0 | HI | 20A |
| E137.15457,N35.05465 | 0:0:1 | 0:0:0 | LO | 20B |
| E137.15456,N35.05465 | 0:0:1 | 0:0:0 | LO | 20B |
| ... | ... | ... | ... | ... |

Fig. 8

ROAD STUD, ROAD STUD SYSTEM, METHOD FOR CONTROLLING ROAD STUD, AND CONTROL PROGRAM PRELIMINARY CLASS

CROSS REFERENCE TO RELATED APPLICATIONS

This application is based upon and claims the benefit of priority from Japanese patent application No. 2021-191683, filed on Nov. 26, 2021, the disclosure of which is incorporated herein in its entirety by reference.

BACKGROUND

The present disclosure relates to a road stud, a road stud system, a method for controlling a road stud, and a control program.

Various efforts have been made to make roads more convenient. For example, a road stud that includes solar cells and a light emission unit and causes the light emission unit to emit a light by using sunlight has been proposed (Japanese Unexamined Patent Application Publication No. 2000-345522).

SUMMARY

However, while the light emission unit emits a light while the solar cells are receiving sunlight in the aforementioned technique, the amount of power obtained from the solar cells is limited. On the other hand, it has been desired that a more effective road stud system be developed.

The present disclosure has been made in order to solve the aforementioned problem and provides a road stud or a road stud system that can be easily used and can be easily controlled.

A road stud according to the present disclosure includes a terminal storage unit, a light emission unit, a moving body detection unit, a radio communication unit, and a terminal control unit. The terminal storage unit stores preset unique fixed position information. The light emission unit emits a preset light to the surroundings. The moving body detection unit generates a detection signal indicating that a nearby moving body has been detected. The radio communication unit receives, based on the fixed position information, an instruction signal for an operation of the light emission unit from a predetermined control system and transmits the detection signal to the control system. The terminal control unit controls the light emission unit based on the instruction signal.

With the above-described configuration, the road stud is able to use fixed position information as an identifier and receive an instruction that is associated with the position information from a control system.

In the above road stud, the terminal storage unit may store the fixed position information that corresponds to information on the position where the road stud is embedded. Accordingly, the road stud is able to receive an instruction of a light emission operation associated with the position where this road stud is embedded.

The road stud may further include a storage battery that receives power supplied from a predetermined power supply line. Accordingly, the road stud provides a more suitable operation with stable power.

The road stud further includes a transformer associated with a power line of an alternating current (AC) power embedded near the road stud, and the aforementioned storage battery may receive power supply based on a current that is generated in the transformer. Accordingly, the road stud is able to suitably store a desired amount of power.

A road stud system according to the present disclosure includes the aforementioned road stud and a control system configured to control a plurality of road studs. The above control system includes a group control apparatus that is connected to each of the plurality of road studs in such a way that the control system can perform radio communication with each of the plurality of road studs, the group control apparatus controlling the plurality of road studs based on the fixed position information. Accordingly, the road stud system is able to collectively control a plurality of road studs that a group includes.

In the above road stud system, a control system may further include an overall control apparatus that is connected to a plurality of group control apparatuses in such a way that the control system can communicate with the plurality of group control apparatuses and controls the plurality of road studs based on the fixed position information via the group control apparatus. Accordingly, the road stud system is able to collectively control a plurality of road studs provided across a plurality of groups regardless of the arrangement of the groups.

In the above road stud system, the overall control apparatus may include an overall storage unit that manages the fixed position information on each of the plurality of road studs, the state of the light emission unit, the state of the detection signal, and a group attribute according to the group control apparatus. Accordingly, the overall control apparatus is able to transmit an instruction signal associated with the position information.

In the above road stud system, the overall control apparatus may include an estimation unit and an instruction unit. The estimation unit estimates that a moving body is present based on detection signals supplied from the plurality of road studs and the fixed position information related to the road studs that have transmitted the detection signals. The instruction unit transmits an instruction signal for causing the light emission unit of the road stud embedded in an area where the moving body travels to operate based on the above results of the estimation. Accordingly, the road stud system is able to suitably estimate a moving body and performs a light emission operation according to a moving body.

In a method for controlling a road stud according to the present disclosure, a road stud executes a terminal storage step, a light emission step, a moving body detection step, a radio communication step, and a terminal control step. The terminal storage step stores preset unique fixed position information. The light emission step emits a preset light to the surroundings. The moving body detection step generates a detection signal indicating that a nearby moving body has been detected. The radio communication step receives, based on the fixed position information, an instruction signal for an operation of the light emission step from a predetermined control system and transmits the detection signal to the control system. The terminal control step controls the light emission step based on the instruction signal.

According to the aforementioned method, a road stud is able to use fixed position information as an identifier and receive an instruction that is associated with the position information from a control system.

A control program according to the present disclosure causes a computer to execute the following control method. The terminal storage step stores preset unique fixed position information. The light emission step emits a preset light to the surroundings. The moving body detection step generates a detection signal indicating that a nearby moving body has been detected. The radio communication step receives, based on the fixed position information, an instruction signal for an operation of the light emission step from a predetermined control system and transmits the detection signal to the control system. The terminal control step controls the light emission step based on the instruction signal.

According to the aforementioned method, a road stud is able to use fixed position information as an identifier and receive an instruction that is associated with position information from a control system.

According to the present disclosure, it is possible to provide a road stud or a road stud system that are more effective and can be easily controlled.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 8 is a diagram showing group information stored in the overall control apparatus;

DESCRIPTION OF EMBODIMENTS

Hereinafter, the present disclosure will be described based on an embodiment of the present disclosure. However, the disclosure set forth in claims is not limited to the following embodiment. Moreover, it is not absolutely necessary to provide all the configurations to be described in the following embodiment as means for solving the problems. For the sake of clarification of the description, the following description and the drawings are partially omitted and simplified as appropriate. Throughout the drawings, the same symbols are attached to the same elements and overlapping descriptions are omitted as necessary.

Embodiment

Figure 1:
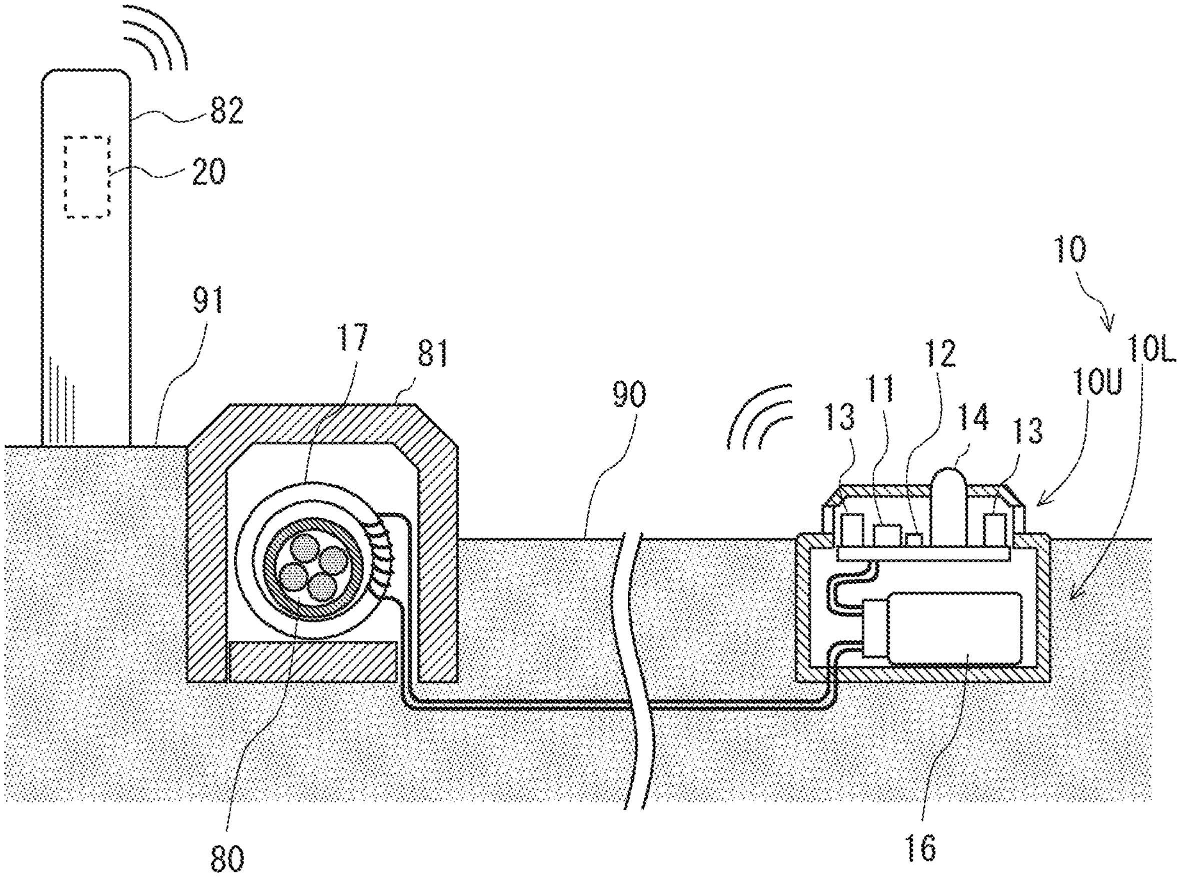
FIG. 1 a cross-sectional view showing a configuration of a road stud according to an embodiment.

Hereinafter, an embodiment will be described. FIG. 1 is a cross-sectional view showing a configuration of a road stud according to the embodiment. FIG. 1 shows a cross section in a plane that is perpendicular to a direction in which a road 90 and a sidewalk 91 are extended. Further, FIG. 1 schematically shows the cross section of a road stud 10 embedded in the road 90. FIG. 1 further includes a piping box 81 embedded between the road 90 and the sidewalk 91 and a multi-purpose pole 82 installed on the sidewalk 91.

The road stud 10 includes a main block 10U that is exposed on the road 90 and a power supply block 10L embedded in the road 90. The road stud 10 is embedded in a desired position in the road 90 in such a way that at least a part of the main block 10U is exposed. The road stud 10 has a metal or resin housing that prevents rainwater, mud, and other foreign objects from entering it from the outside. The main block 10U includes a control substrate including a terminal control unit 11, a radio communication unit 12, a light emission unit 13, a moving body detection unit 14 and the like.

The terminal control unit 11 receives signals as appropriate from each of the components included in the control substrate or controls each of the components. The terminal control unit 11 includes, for example, an integrated circuit called a Central Processing Unit (CPU) or a Micro Controller Unit (MCU).

The radio communication unit 12 communicates with a group control apparatus 20, which is a control system that controls a plurality of the road studs 10. The radio communication unit 12 includes a transmission/reception control circuit that is implemented in the control substrate and controls communication with the control system (the group control apparatus 20) and an antenna part that transmits and receives signals. The radio communication unit 12 communicates with the group control apparatus 20 using, for example, radio waves in a frequency band of 920 megahertz. Note that the above frequency band that the radio communication unit 12 uses is only one example thereof and other frequency bands may instead be used.

The light emission unit 13 includes a light emitting diode (LED) and emits a preset light to the surroundings. The road stud 10 may include a plurality of light emission units 13. Further, the light emission unit 13 may be provided in such a way that it emits light in a plurality of directions different from one another. In this embodiment, the road stud 10 includes two light emission units 13. The two light emission units 13 are provided in such a way that they emit light in directions opposite to each other. In the main block 10U, windows that transmit light are provided on the outside of the two light emission units 13. Since the light emission units 13 emit light, nearby pedestrians or drivers of automobiles are able to visually recognize the light emitted from the road studs 10. The two light emission units 13 may include LEDs having the same specification or may include LEDs having specifications different from each other. The two light emission units 13 may be controlled in such a way that the color tone, luminance, timings when they emit light or the like are different from each other.

The moving body detection unit 14, which is a moving body sensor, detects nearby moving bodies using electromagnetic waves such as infrared rays or microwaves. In the moving body detection unit 14, a transmission part for receiving the electromagnetic waves is exposed from the housing of the road stud 10.

The power supply block 10L, which is located below the main block 10U, is embedded in the road 90. The power supply block 10L includes a storage battery 16 and a transformer 17.

The storage battery 16, which is connected to the transformer 17 that will be described later, receives power from the transformer 17. The storage battery 16 converts an alternating current received from the transformer 17 into a direct current as appropriate, receives a predetermined voltage, and stores power. The storage battery 16 supplies the stored power to the control substrate included in the main block 10U. Accordingly, the road stud 10 provides a suitable operation with stable power.

The transformer 17 is provided along with a power line of an AC power embedded near the road stud 10. The transformer 17 includes a coil around the AC power line. Accordingly, the transformer 17 generates an alternating current. The transformer 17 supplies the generated current to the storage battery 16 via an electric wire (power supply line). According to the aforementioned configuration, the road studs 10 are able to suitably store a desired power.

The piping box 81 is installed between the road 90 and the sidewalk 91. The piping box 81 is, for example, a rectangular and hollow piping equipment made of concrete. The hollow part of the piping box 81 contains social infrastructure such as a power transmission line, a distribution line, or an optical cable. The piping box 81 shown in FIG. 1 includes a hollow part that includes a power line 80. In the transformer 17, a magnetic body made of iron, and a coil, surround the power line 80. Accordingly, current is generated in the transformer 17.

The road studs 10 have been described above. FIG. 1 shows a road stud 10 having a configuration in which the main block 10U and the part of the power supply block 10L that stores the storage battery 16 are integrated with each other. Instead, the road stud 10 may have a configuration in which the main block 10U and the power supply block 10L are separated from each other. This configuration allows the road stud 10 to be installed in a more flexible manner.

Next, the group control apparatus 20 will be described. The group control apparatus 20 shown in FIG. 1 is embedded in the multi-purpose pole 82. The multi-purpose pole 82, which is installed in a predetermined position in the road, includes various kinds of equipment such as a base station of a wireless network or a mobile telephone, a surveillance camera, or a lamp.

The group control apparatus 20 communicates with a plurality of road studs 10 and controls each of the road studs 10 which the group control apparatus 20 communicates with. The group control apparatus 20 communicates with, for example, several tens or several hundreds of road studs 10 by radio communication.

Figure 2:
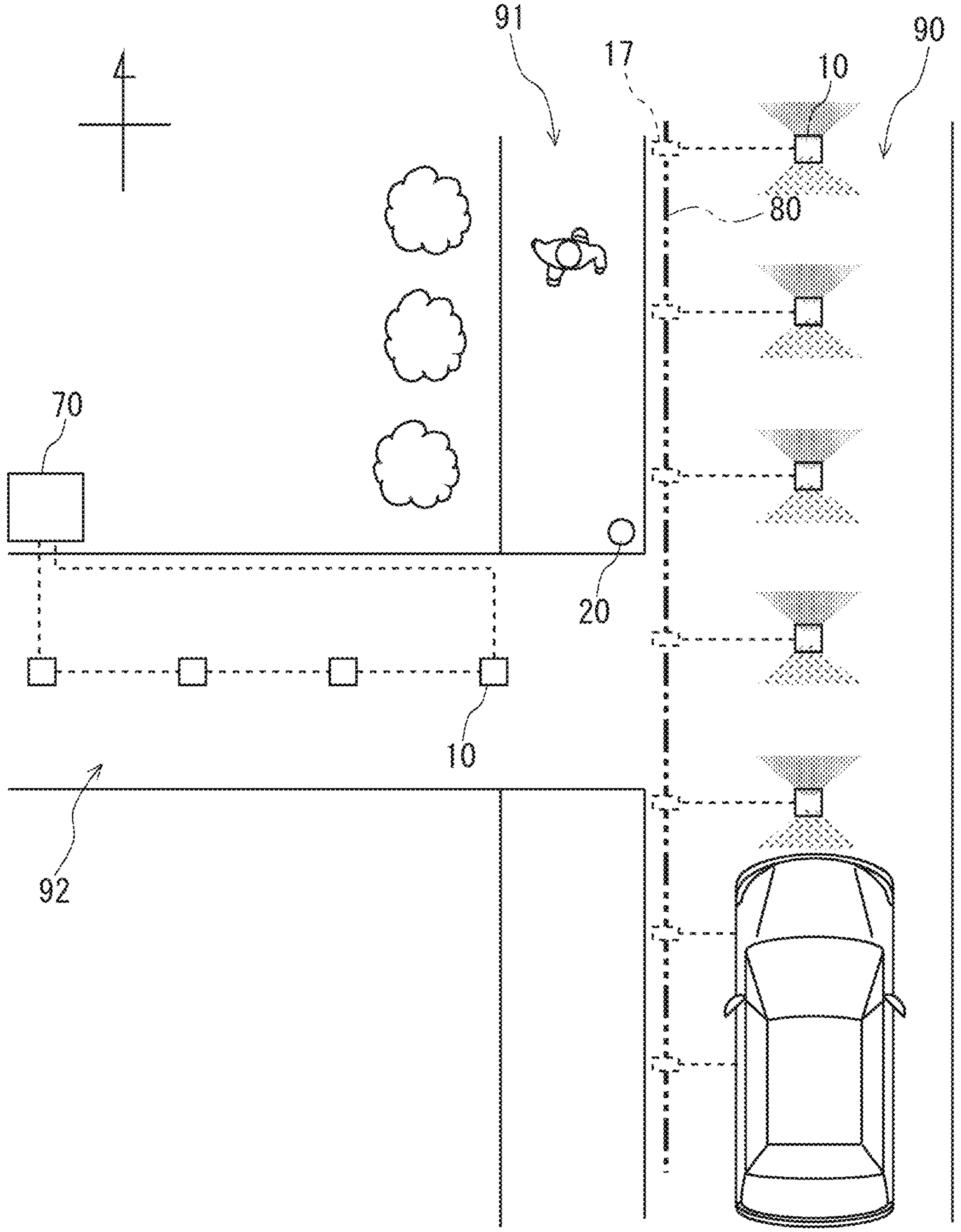
FIG. 2 is a plan view showing a configuration of a road stud system.

With reference next to FIG. 2, the road studs 10 and the group control apparatus 20 will be further described. FIG. 2 is a plan view showing a configuration of a road stud system. FIG. 2 shows streets where the road stud system is installed. In FIG. 2, the upper direction indicates north, the lower direction indicates south, the right direction indicates east, and the left direction indicates west.

In FIG. 2, the road 90 is extended in the north-south direction. Further, the sidewalk 91 is extended in the west of the road 90 in such a way that the sidewalk 91 is parallel to the road 90. The power line 80 is embedded near the boundary between the road 90 and the sidewalk 91 in such a way that the power line 80 is parallel to the road 90. Further, a side road 92 is extended toward west from the middle part of the sidewalk 91.

In the road 90 shown in FIG. 2, the road studs 10 are embedded in the center of the road 90 in such a way that they are installed every few meters at equal intervals. In each of the road studs 10, the transformer 17 is provided along with the power line 80. As described above, the road studs 10 independently secure power, which is a power supply. Accordingly, a road stud 10 where there is a problem such as a failure does not affect the other road studs 10.

Each of the road studs 10 embedded in the road 90 includes two light emission units 13. One of the two light emission units 13 that each of the road studs 10 includes emits a light in the direction of south and the other one of the two light emission units 13 emits a light in the direction of north.

In FIG. 2, the group control apparatus 20 is installed near the place where the road 90 meets the side road 92. The group control apparatus 20 controls the plurality of road studs 10 shown in FIG. 2. That is, the group control apparatus 20 controls the plurality of road studs 10 that communicate with the group control apparatus 20 as a group that it manages.

On the road 90, an automobile is travelling from south to north. In this case, in each of the road studs 10, the moving body detection unit 14 detects this automobile and emits a green light toward the direction of south where the automobile is present. Further, each of the road studs 10 emits, for example, a red light toward the direction of north, which is a direction opposite to the direction of south where the automobile is present.

Next, another aspect of the road studs 10 will be described. A power supply apparatus 70 is installed in the north of the side road 92. The power supply apparatus 70 is an apparatus for supplying power to the plurality of road studs 10. In the power supply apparatus 70, a power supply line is connected to the plurality of road studs 10 in a chain manner so that the power supply apparatus 70 is able to supply generated power to the plurality of road studs 10. A power line is not embedded in the side road 92. If the road studs 10 are installed in the road of this kind, the road studs 10 are able to receive power supplied from the power supply apparatus 70.

Figure 3:
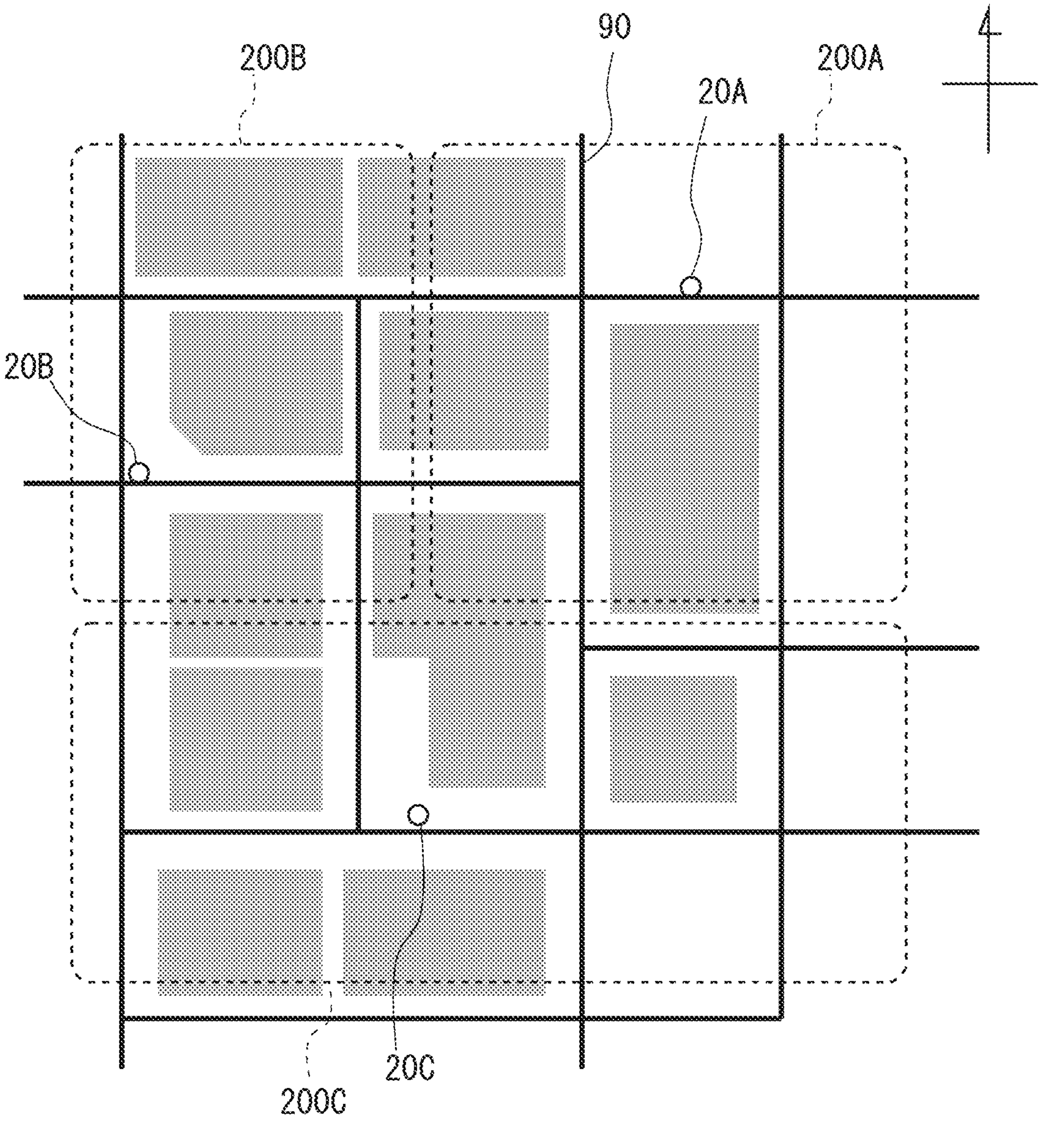
FIG. 3 is a plan view showing a configuration of groups according to the road stud system.

With reference next to FIG. 3, the road stud system will be further described. FIG. 3 is a plan view showing a configuration of groups according to the road stud system. FIG. 3 shows streets in an area wider than that shown in FIG. 2, and shows a predetermined city area. In the plan view shown in FIG. 3, the directions are defined, like in FIG. 2. In FIG. 3, thick straight lines that are extended in the east-west direction or the north-south direction show roads 90. The parts shown in gray surrounded by the roads 90 are buildings or the like.

Three group control apparatuses 20 (20A, 20B, and 20C) are installed in FIG. 3. Each of the group control apparatuses 20 is surrounded by a dotted rectangle. The dotted rectangle shows an area where road studs 10 managed by each group control apparatus 20 are provided. That is, the group control apparatus 20A controls the road studs 10 arranged in an area 200A. The group control apparatus 20B controls the road studs 10 arranged in an area 200B. Then, the group control apparatus 20C controls the road studs 10 arranged in an area 200C.

Figure 4:
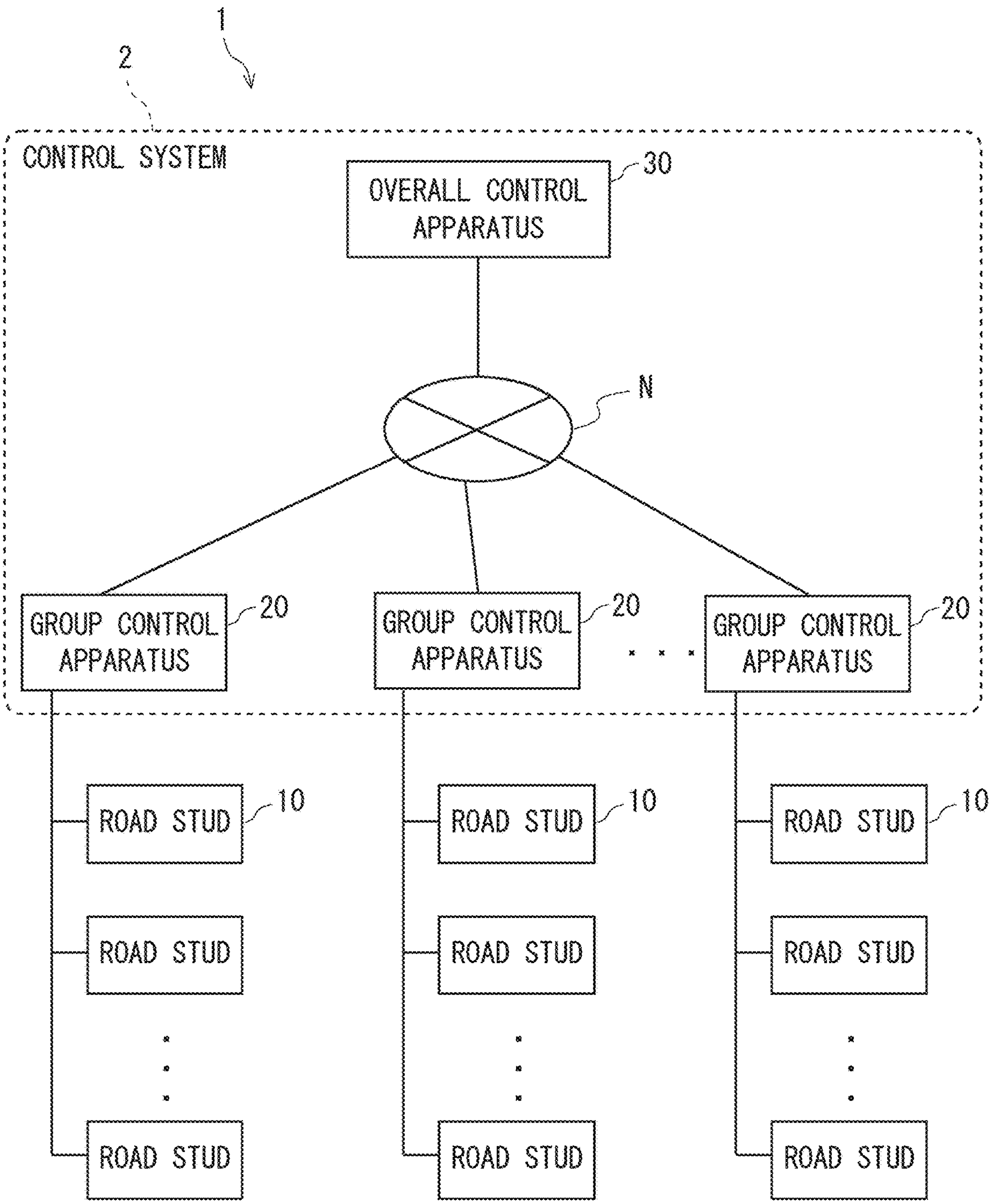
FIG. 4 is a block diagram showing an overview of the road stud system according to the embodiment.

With reference next to FIG. 4, the road stud system will be further described. FIG. 4 is a block diagram showing an overview of the road stud system according to the embodiment. FIG. 4 shows a block diagram of a road stud system 1. The road stud system 1 includes a control system 2 and a plurality of road studs 10 controlled by the control system 2.

The control system 2 includes a plurality of group control apparatuses 20 and an overall control apparatus 30. The plurality of group control apparatuses 20 and the overall control apparatus 30 are connected to each other in such a way that the group control apparatuses 20 and the overall control apparatus 30 are able to communicate with each other via a network N. As described above, each of the group control apparatuses 20 controls a plurality of road studs 10, which correspond to a group thereof, the plurality of road studs 10 being connected to the group control apparatus 20 in such a way that they can perform radio communication. The group control apparatus 20 supplies information received from the road studs 10 to the overall control apparatus 30. Further, the group control apparatus 20 receives an instruction signal for the road studs 10 from the overall control apparatus 30, and supplies the received instruction signal to the road studs 10.

The overall control apparatus 30 is connected to the plurality of group control apparatuses 20 via the network N. The overall control apparatus 30 receives information regarding the road studs 10 from the group control apparatus 20. Further, the overall control apparatus 30 supplies an instruction signal for controlling the road studs 10 to the group control apparatus 20 in accordance with the received information.

Note that the road studs 10, the group control apparatus 20, and the overall control apparatus 30, each including a circuit board in which a flash memory, a Dynamic Random Access Memory (DRAM), and a Central Processing Unit (CPU) are, for example, implemented, execute a control program stored in a memory, thereby implementing the function of the system. Further, the road studs 10, the group control apparatus 20, and the overall control apparatus 30 may be implemented by any combination of hardware, firmware, and software, instead of being implemented by software by the control program stored in the non-volatile memory in advance.

Figure 5:
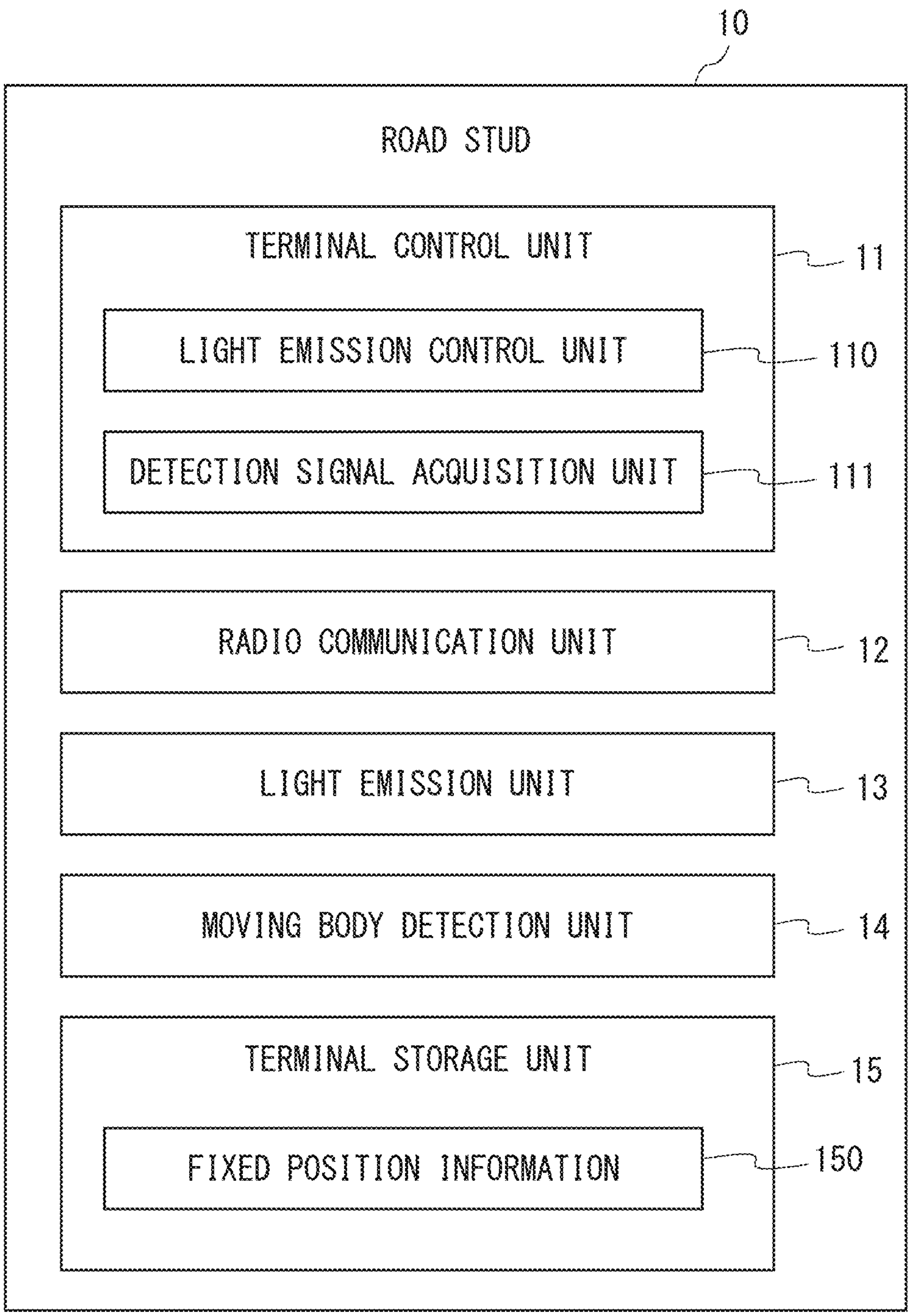
FIG. 5 is a block diagram of the road stud according to the embodiment.

With reference next to FIG. 5, a function of the road stud 10 will be described. FIG. 5 is a block diagram of the road stud according to the embodiment. The road stud 10 includes a terminal control unit 11, a radio communication unit 12, a light emission unit 13, a moving body detection unit 14, and a terminal storage unit 15. The aforementioned components are connected to one another in such a way that they can communicate with one another via a communication bus as appropriate.

The terminal control unit 11 is connected to each component of the road studs 10 and controls the road studs 10. The terminal control unit 11 includes a light emission control unit 110 and a detection signal acquisition unit 111. The light emission control unit 110 receives an instruction signal via the radio communication unit 12 and controls the light emission unit 13 in accordance with the received instruction signal. When, for example, the light emission unit 13 includes a set of LEDs of three colors, that is, R (red), G (green), and B (blue), the light emission control unit 110 instructs the frequency of light emission of each color. The detection signal acquisition unit 111 acquires the detection signal generated by the moving body detection unit 14 and transmits the acquired detection signal to the group control apparatus 20 via the radio communication unit 12.

The radio communication unit 12 performs radio communication with the control system 2 (i.e., the group control apparatus 20). The radio communication unit 12 includes a transmission circuit, a reception circuit, an antenna and the like for achieving radio communication with the group control apparatus 20. The radio communication unit 12 receives an instruction signal for the operation of the light emission unit from the group control apparatus 20. Upon receiving the instruction signal, the radio communication unit 12 supplies the received instruction signal to the terminal control unit 11. Upon receiving the detection signal from the terminal control unit 11, the radio communication unit 12 transmits the received detection signal to the group control apparatus 20.

When the radio communication unit 12 performs the aforementioned radio communication, the radio communication unit 12 uses fixed position information stored in the terminal storage unit 15 as information for causing the control system 2 to identify the radio communication unit 12. That is, when, for example, the radio communication unit 12 transmits a detection signal to the group control apparatus 20, it transmits the fixed position information along with the detection signal. The radio communication unit 12 further receives an instruction signal along with the fixed position information when the radio communication unit 12 receives a predetermined instruction signal from the group control apparatus 20.

The "fixed position information", which is preset position information, is also unique identification information that the control system 2 is able to identify the radio communication unit 12. The position information, which corresponds to information on positions where the road studs 10 are embedded, is fixed information. The fixed position information is determined, for example, by specifying positions where the road studs 10 are embedded in predetermined map information linked to the latitude and the longitude. Accordingly, the road studs 10 are able to receive an instruction of the light emission operation associated with the positions where the road studs are embedded.

The light emission unit 13 emits, in accordance with an instruction from the light emission control unit 110, a light to an area near the road studs 10 according to the color and the frequency in accordance with the instruction. If the moving body detection unit 14 detects a moving body, the moving body detection unit 14 generates a detection signal. The moving body detection unit 14 supplies the generated detection signal to the detection signal acquisition unit 111.

The terminal storage unit 15 includes a non-volatile memory such as a flash memory, an Erasable Programmable Read Only Memory (EPROM) or a Solid State Drive (SSD). The terminal storage unit 15 stores the aforementioned fixed position information 150. The terminal storage unit 15 stores fixed position information 150 in advance before the road studs 10 are embedded. The terminal storage unit 15 may be an overwrite-prohibited storage area. The terminal storage unit 15 may be a register associated with a CPU. In the terminal storage unit 15, the fixed position information 150 may be updated by the control system 2 after the road studs 10 are embedded.

The road studs 10 have been described above. With the above-described configuration, the road studs 10 are able to use the fixed position information as an identifier and receive an instruction that is associated with the position information from the group control apparatus 20.

Figure 6:
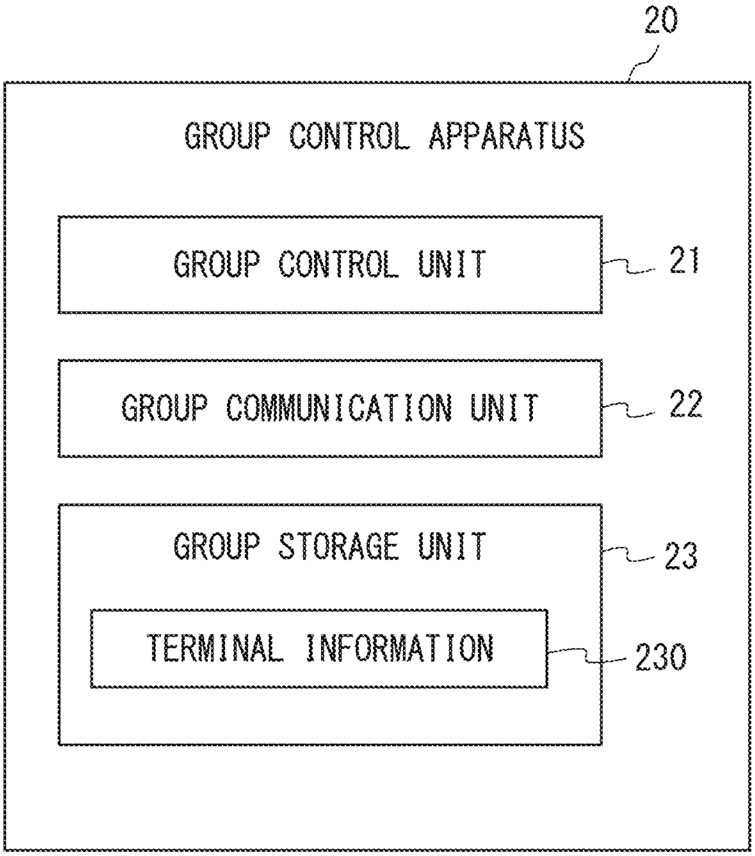
FIG. 6 is a block diagram of a group control apparatus according to the embodiment.

With reference next to FIG. 6, a function of the group control apparatus 20 will be described. FIG. 6 is a block diagram of the group control apparatus according to the embodiment. The group control apparatus 20 includes a group control unit 21, a group communication unit 22, and a group storage unit 23.

The group control unit 21 transmits instruction signals to the plurality of road studs 10 controlled by the group control apparatus 20 as appropriate. Upon receiving an instruction signal from the overall control apparatus 30, the group control unit 21 transmits an instruction signal to the road stud 10 in accordance with the received instruction signal. In order to implement the aforementioned function, the group control unit 21 is connected to the group communication unit 22 and exchanges various kinds of signals. The group control unit 21 further reads terminal information from the group storage unit 23 as necessary. Further, the group control unit 21 updates the terminal information of the group storage unit 23 as necessary.

The group communication unit 22 communicates with each of the plurality of road studs 10. The group communication unit 22 also communicates with the overall control apparatus 30. The group communication unit 22 includes a transmission circuit, a reception circuit, an interface and the like for achieving communication with the road studs 10 and the overall control apparatus 30. Note that the communication method in the case in which the group communication unit 22 communicates with the road studs 10 may be the same as or different from the communication method in the case in which the group communication unit 22 communicates with the overall control apparatus 30.

The group storage unit 23 includes a non-volatile memory such as a flash memory. The group storage unit 23 stores terminal information 230. The terminal information 230 includes at least fixed position information 150 of road studs 10 controlled by the group control apparatus 20. Further, the terminal information 230 may include information regarding the operation state of the light emission unit 13 in each of the road studs 10 or information indicating whether the moving body detection unit 14 is transmitting a detection signal. When the terminal information 230 includes the information regarding the operation state of the light emission unit 13 or the state of the detection signal, the group control unit 21 updates the terminal information 230 as appropriate. According to the aforementioned configuration, the group control apparatus 20 is able to collectively control a plurality of road studs connected to the group control apparatus 20.

Figure 7:
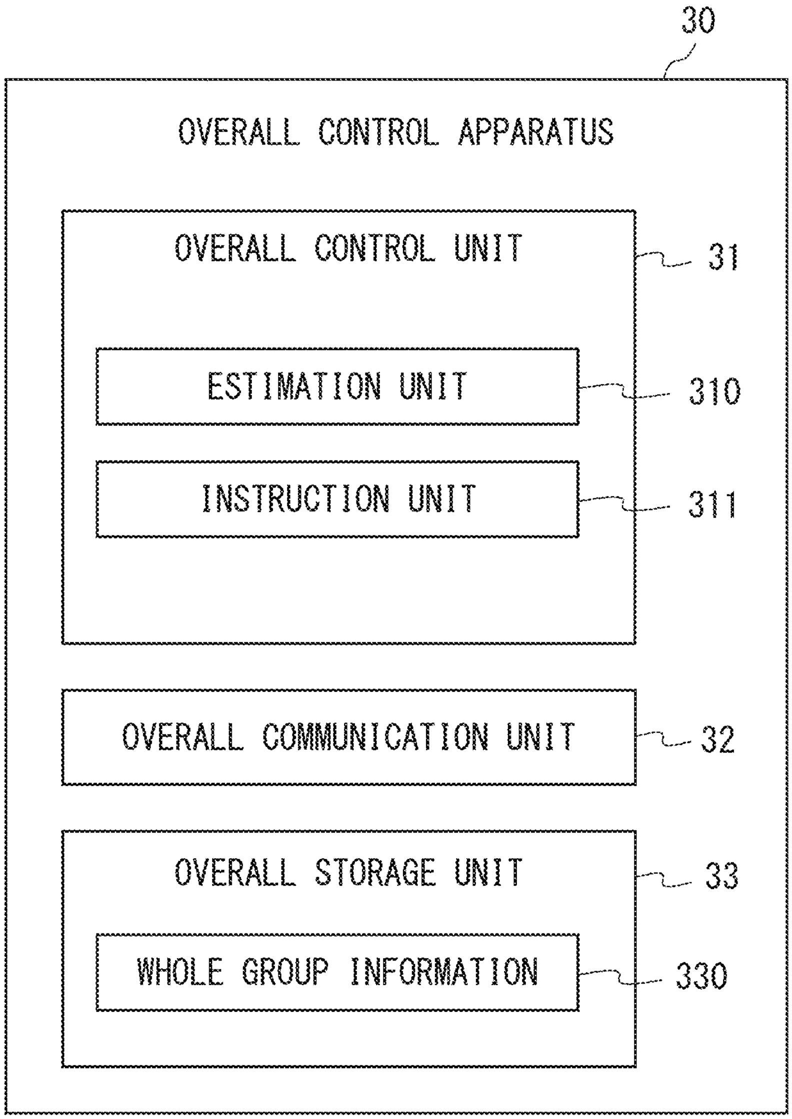
FIG. 7 is a block diagram of an overall control apparatus according to the embodiment.

With reference next to FIG. 7, a function of the overall control apparatus 30 will be described. FIG. 7 is a block diagram of the overall control apparatus according to the embodiment. The overall control apparatus 30 is, for example, a computer. The overall control apparatus 30 includes an overall control unit 31, an overall communication unit 32, and an overall storage unit 33.

The overall control unit 31 controls a plurality of road studs 10 connected thereto via the group control apparatus 20. The overall control unit 31 includes an estimation unit 310 and an instruction unit 311. The estimation unit 310 receives detection signals supplied from the road studs 10 via the group control apparatus 20. The estimation unit 310 estimates that a moving body is present from a received detection signal and the fixed position information of the road stud 10 that has transmitted the detection signal. The instruction unit 311 transmits, from the results of the aforementioned estimation by the estimation unit 310, an instruction signal for operating the light emission unit 13 of the road stud 10 embedded in an area where the moving body travels. With the above-described configuration, the road stud system 1 is able to suitably estimate a moving body and perform a light emission operation that corresponds to the moving body.

The overall communication unit 32 communicates with the group control apparatus 20 via a network N. The overall storage unit 33 includes a transmission circuit, a reception circuit, an interface and the like for implementing communication with the group control apparatus 20. The overall communication unit 32 supplies a detection signal received from the group control apparatus 20 to the overall control unit 31. Further, the overall communication unit 32 transmits the instruction signal received from the overall control unit 31 to the group control apparatus 20.

The overall storage unit 33 includes a non-volatile memory such as a flash memory. The overall storage unit 33 stores whole group information 330. The whole group information 330 includes fixed position information on each of the road studs 10 included in the terminal information 230 managed by each group control apparatus 20, the operation state of the light emission unit 13 of each of the road studs 10, and the state of the detection signal of the moving body detection unit 14. The overall control apparatus 30 stores the whole group information 330 in the overall storage unit 33 and updates the whole group information 330 as appropriate. Accordingly, the overall control apparatus 30 manages the respective states of the road studs 10. That is, the overall control apparatus 30 is able to collectively control a plurality of road studs that all the groups include.

With reference next to FIG. 8, the whole group information will be described. FIG. 8 is a diagram showing the whole group information stored in the overall control apparatus. The table shown in FIG. 8 shows an example of the whole group information 330. The whole group information 330 includes the fixed position information, states of the light emission units, the state of the detection signal, and group attribute information.

The fixed position information is positional information that each of the road studs 10 includes. For example, the first row of the table shows "E137.16021,N35.05075", which is also the fixed position information 150.

On the right side of the fixed position information 150, as the states of the two light emission units 13 that the road stud 10 includes, "the state of the light emission unit A" is indicated as "0:1:0" and "the state of the light emission unit B" is indicated as "1:0:0". They indicate the operation states of RGB of the light emission units 13, "0" indicating off and "1" indicating on. That is, the road stud 10 in the first row is in a state in which the light emission unit A is lit green and the light emission unit B is lit red. Likewise, for example, the road stud 10 in the third row has a state in which the light emission units 13 are not lit. Further, the road stud 10 in the fourth row is in a state in which the light emission unit A is lit blue and the light emission unit B is not lit.

In the whole group information 330, states of detection signals are indicated by "HI" or "LO". "HI" indicates a state in which the moving body detection unit detects a moving body and "LO" indicates a state in which the moving body detection unit does not detect a moving body. In the road stud 10 in the first row, the state of the detection signal is "LO". That is, the road stud 10 in the first row has a state in which the moving body is not detected. Further, the road studs 10 in the second and third rows have a state in which the moving body is detected.

On the right side of the state of the detection signal, the group attribute information is shown. The group attribute information indicates which group the road stud 10 according to the fixed position information 150 indicated in one row belongs to. The group attribute information indicates, for example, that the road studs 10 from the first to third rows are controlled by the group control apparatus 20A. Further, the road studs 10 in the fourth and fifth rows are controlled by the group control apparatus 20B.

The whole group information 330 has been described above. Of the whole group information 330, an information group including the same group attribute information is the same as the terminal information 230 of this group. That is, the whole group information 330 is also a set of the pieces of the terminal information 230 that the respective group control apparatuses 20 include. Further, the terminal information 230 includes the fixed position information 150 of each of the road studs 10 that the group control apparatus 20 includes.

Of the whole group information, the state of the light emission unit 13 and the state of the detection signal may constantly change. These information items are updated, for example, every second. Therefore, the whole group information 330 may store, for example, the history for a preset period. The overall control unit 31 may estimate the presence of a moving body from the history for the preset period.

Figure 9:
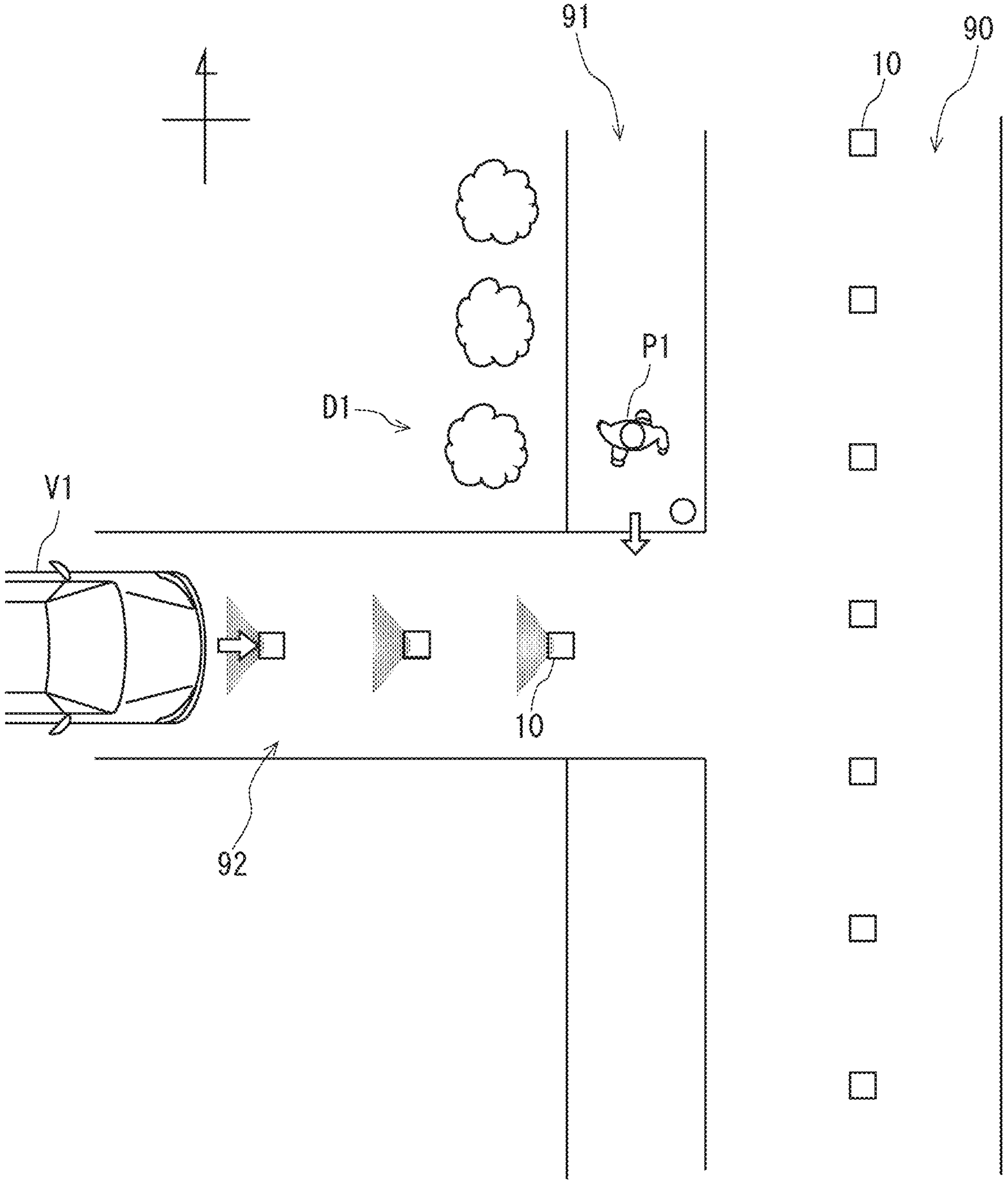
FIG. 9 is a diagram showing an example of an operation of the road stud system according to the embodiment.

With reference next to FIG. 9, an example of the operation of the overall control unit 31 will be described. FIG. 9 is a diagram showing one example of the operation of the road stud system according to the embodiment. FIG. 9 shows streets the same as those shown in FIG. 2. In the streets shown in FIG. 9, a pedestrian P1 is walking along a sidewalk 91 from north to south. The pedestrian P1 is about to cross a side road 92. Further, an automobile V1 is travelling toward east from west of the side road 92.

Under the aforementioned situation, road studs 10 embedded near the pedestrian P1 detect a motion of the pedestrian P1. Likewise, road studs 10 embedded near the automobile V1 detect a motion of the automobile V1. There is a street tree D1 near the pedestrian P1 and this street tree D1 sways in the wind. Therefore, road studs 10 embedded near the street tree D1 detect a motion of the street tree D1 as well.

As described above, the estimation unit 310 receives detection signals indicating that the motion of each of the pedestrian P1, the automobile V1, and the street tree D1 has been detected from the plurality of road studs 10. The estimation unit 310 refers to the fixed position information of the road studs 10 and the history of the detection signals and estimates whether or not the moving body according to the detection signals is moving. Accordingly, the estimation unit 310 is able to estimate that the pedestrian P1 and the automobile V1 are moving bodies, not estimating that the street tree D1 is a moving body.

Once the estimation unit 310 estimates the moving bodies, the estimation unit 310 is able to further estimate the type of a pedestrian or an automobile from the positions and the speeds of the respective moving bodies. As a result of the aforementioned estimation, the estimation unit 310 further estimates that the automobile V1 is approaching the area where the pedestrian P1 is moving. Upon receiving the results of the estimation, the instruction unit 311 of the overall control unit 31 transmits an instruction signal for instructing an operation of the light emission unit 13 to the road studs 10 in the area where the automobile V1 is travelling. The instruction signal includes an instruction for lighting an LED of the light emission unit 13 on the west side red.

Examples of the operation of the overall control unit 31 have been described above. As described above, the overall control apparatus 30 is able to estimate the moving body from the fixed position information and the detection signal and transmit an instruction signal in accordance with the results of the estimation.

Figure 10:
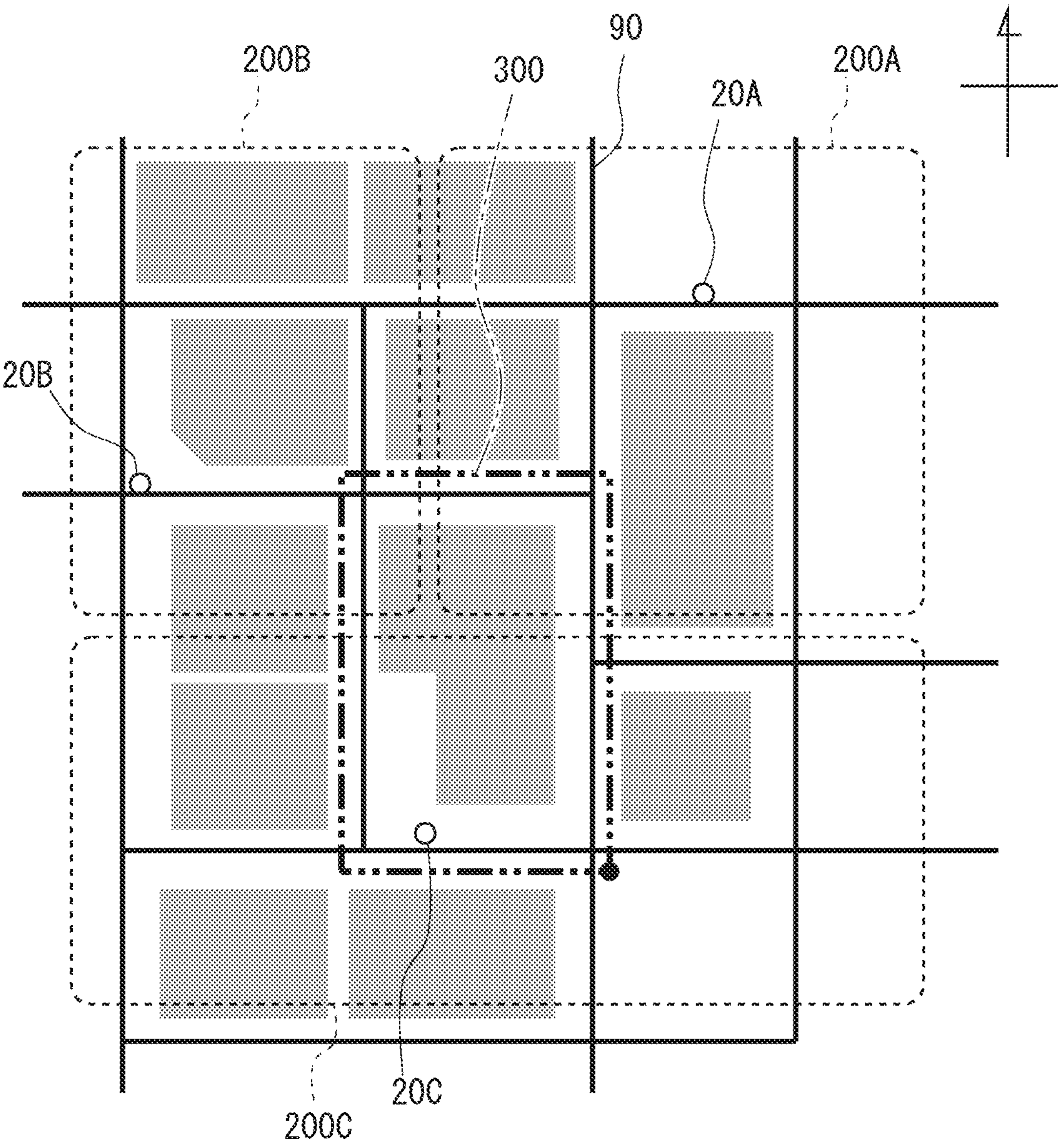
FIG. 10 is a diagram for describing an area specified by an instruction unit in the road stud system.

With reference next to FIG. 10, an aspect of the instruction signal instructed by the instruction unit 311 will be described. FIG. 10 is a diagram for describing an area specified by the instruction unit in the road stud system. The streets shown in FIG. 10 are the same as those shown in FIG. 3. FIG. 10 is different from FIG. 3 in that an area 300 is provided at the center of the streets in FIG. 10.

The area 300 shown in the streets shown in FIG. 10 is an area that the instruction unit 311 has set in order to instruct a light emission operation of the road studs 10. The instruction unit 311 instructs, for example, the light emission units 13 of the road studs 10 located in the area 300 to emit blue light. In this case, the instruction unit 311 is able to compare the position information of the area 300 with the fixed position information of the plurality of road studs 10 and extract road studs 10 included in the area 300.

Further, the instruction unit 311 may transmit a signal for instructing lighting of the light emission unit 13 of each of the road studs 10 included in the area 300 to the group control apparatus 20A, the group control apparatus 20B, and the group control apparatus 20C. In this case, the group control apparatus 20A, the group control apparatus 20B, and the group control apparatus 20C that have received the instruction compares the fixed position information of the road studs 10 that they respectively include with the area 300 and extracts road studs 10 to be instructed.

As described above, the overall control apparatus 30 controls a plurality of road studs based on the fixed position information via the plurality of group control apparatuses 20. Accordingly, the road stud system 1 is able to collectively control a plurality of road studs 10 provided across a plurality of groups regardless of the arrangement of the groups.

The embodiment has been described above. According to the embodiment, it is possible to provide a road stud and a road stud system that are more effective and can be easily controlled.

The present disclosure is not limited to the aforementioned embodiment and may be changed as appropriate without departing from the spirit of the present disclosure.

The aforementioned program includes instructions (or software codes) that, when loaded into a computer, cause the computer to perform one or more of the functions described in the embodiment. The program may be stored in a non-transitory computer readable medium or a tangible storage medium. By way of example, and not a limitation, computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A road stud system comprising:

a control system configured to control a plurality of road studs, wherein the control system comprises a group control apparatus that is connected to each of the plurality of road studs in such a way that the control system can perform radio communication with each of the plurality of road studs, the group control apparatus controlling the plurality of road studs based on fixed position information; and a road stud comprising:

a terminal storage unit configured to store preset unique fixed position information;

a light emission unit configured to emit a preset light to surroundings;

a moving body detection unit configured to generate a detection signal indicating that a nearby moving body has been detected;

a radio communication unit configured to receive, based on the fixed position information, an instruction signal for an operation of the light emission unit from the control system and transmit the detection signal to the control system; and a terminal control unit configured to control the light emission unit based on the instruction signal.

2. The road stud system according to claim 1, wherein the terminal storage unit stores the fixed position information that corresponds to information on the position where the road stud is embedded.

3. The road stud system according to claim 1, the road stud further comprising a storage battery that receives power supplied from a predetermined power supply line.

4. The road stud system according to claim 3, the road stud further comprising a transformer provided along with a power line of an AC power embedded near the road stud, wherein the storage battery receives power supply based on a current that is generated in the transformer.

5. The road stud system according to claim 1, wherein the control system further comprises an overall control apparatus that is connected to a plurality of group control apparatuses in such a way that the control system can communicate with the plurality of group control apparatuses and controls the plurality of road studs based on the fixed position information via the group control apparatus.

6. The road stud system according to claim 5, wherein the overall control apparatus comprises an overall storage unit that manages the fixed position information on each of the plurality of road studs, a state of the light emission unit, a state of the detection signal, and a group attribute according to the group control apparatus.

7. The road stud system according to claim 5, wherein the overall control apparatus further comprises:

an estimation unit configured to estimate that a moving body is present based on detection signals supplied from the plurality of road studs and the fixed position information related to road studs that have transmitted the detection signals; and an instruction unit configured to transmit an instruction signal for causing the light emission unit of the road stud embedded in an area where the moving body travels to operate based on results of the estimation.

8. A method for controlling a plurality of road studs of a road stud system, the road stud system executing the following processing of:

a control step of performing radio communication with each of the plurality of road studs and controlling the plurality of road studs based on fixed position information;

a terminal storage step of storing preset unique fixed position information;

a light emission step of emitting a preset light to surroundings;

a moving body detection step of generating a detection signal indicating that a nearby moving body has been detected;

a radio communication step of receiving, based on the fixed position information, an instruction signal for an operation of the light emission step from a control system and transmit the detection signal to the control system; and a terminal control step of controlling the light emission step based on the instruction signal.

9. A non-transitory computer readable medium storing a control program for causing a computer to execute a method for controlling a plurality of road studs of a road stud system, the method comprising:

a control step of performing radio communication with each of the plurality of road studs and controlling the plurality of road studs based on fixed position information;

a terminal storage step of storing preset unique fixed position information;

a light emission step of emitting a preset light to surroundings;

a moving body detection step of generating a detection signal indicating that a nearby moving body has been detected;

a radio communication step of receiving, based on the fixed position information, an instruction signal for an operation of the light emission step from a control system and transmit the detection signal to the control system; and a terminal control step of controlling the light emission step based on the instruction signal.

* * * * *